(12) United States Patent
Dao et al.

(10) Patent No.: US 11,146,653 B2
(45) Date of Patent: Oct. 12, 2021

(54) METHOD, DATA SENDING CONTROL SERVER, STORAGE SERVER, PROCESSING SERVER AND SYSTEM FOR SENDING DATA TO AT LEAST ONE DEVICE

(71) Applicant: GEMALTO SA, Meudon (FR)

(72) Inventors: Frédéric Dao, Gemenos (FR); Frédéric Clement-Gonzales, Gemenos (FR); David Halle, Gemenos (FR); Jérôme Duprez, Gemenos (FR); David Huguenin, Gemenos (FR); Sébastien Schmitt, Gemenos (FR); Christine Nersessian, Gemenos (FR); Philippe Allouche, Gemenos (FR); Thomas Dandelot, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/338,595

(22) PCT Filed: Oct. 2, 2017

(86) PCT No.: PCT/EP2017/074997
§ 371 (c)(1),
(2) Date: Apr. 1, 2019

(87) PCT Pub. No.: WO2018/065371
PCT Pub. Date: Apr. 12, 2018

(65) Prior Publication Data
US 2019/0313258 A1 Oct. 10, 2019

(30) Foreign Application Priority Data

Oct. 3, 2016 (EP) .................................. 16306292

(51) Int. Cl.
*H04L 29/08* (2006.01)
*H04L 29/06* (2006.01)
(Continued)

(52) U.S. Cl.
CPC ........ *H04L 67/2833* (2013.01); *H04L 63/108* (2013.01); *H04L 67/325* (2013.01);
(Continued)

(58) Field of Classification Search
CPC ....... H04W 12/08; H04W 8/20; H04W 29/08; H04W 29/06; H04L 63/108; H04L 67/325; H04L 67/2833
See application file for complete search history.

(56) References Cited

U.S. PATENT DOCUMENTS

2003/0123422 A1* 7/2003 Miya ....................... H04L 29/06
                                                                370/338
2004/0064572 A1* 4/2004 Yamaguchi ......... G06F 21/6218
                                                                709/229
(Continued)

FOREIGN PATENT DOCUMENTS

CN          102754512 A    10/2012
EP            2836052 A1    2/2015
(Continued)

OTHER PUBLICATIONS

International Search Report (PCT/ISA/210) dated Oct. 24, 2017, by the European Patent Office as the International Searching Authority for International Application No. PCT/EP2017/074997.
(Continued)

*Primary Examiner* — Chi Ho A Lee
*Assistant Examiner* — Andrew Lee
(74) *Attorney, Agent, or Firm* — Buchanan Ingersoll & Rooney PC

(57) ABSTRACT

The invention relates to a method for sending data to at least one device. According to the invention, a data sending
(Continued)

control server sends to at least one data storage server at least one predetermined rule or a first request for sending data to at least one data processing server. The data storage server sends, based upon the at least one predetermined rule or the first request for sending data, data to the data processing server. The data sending control server sends to the data processing server a second request for sending to the device the data received or to be received by the data processing server. The data processing server sends, based upon the second request for sending the data, the received data to the at least one device.

8 Claims, 1 Drawing Sheet

(51) Int. Cl.
*H04W 8/20* (2009.01)
*H04W 12/088* (2021.01)

(52) U.S. Cl.
CPC ........... *H04W 8/20* (2013.01); *H04W 12/088* (2021.01); *H04L 67/28* (2013.01)

(56) References Cited

U.S. PATENT DOCUMENTS

| | | | | |
|---|---|---|---|---|
| 2006/0095470 | A1* | 5/2006 | Cochran | G06F 16/10 |
| 2008/0250095 | A1* | 10/2008 | Mizuno | H04N 7/17318 |
| | | | | 709/201 |
| 2010/0330969 | A1* | 12/2010 | Kim | H04W 8/22 |
| | | | | 455/414.1 |
| 2011/0201267 | A1 | 8/2011 | Synnergren et al. | |
| 2011/0292981 | A1* | 12/2011 | Kihara | H04N 17/004 |
| | | | | 375/224 |
| 2012/0011261 | A1* | 1/2012 | Hirano | H04L 65/1066 |
| | | | | 709/228 |
| 2014/0139835 | A1* | 5/2014 | Kim | G01N 21/274 |
| | | | | 356/402 |
| 2014/0310371 | A1* | 10/2014 | Panchal | H04L 67/2842 |
| | | | | 709/213 |
| 2014/0379835 | A1* | 12/2014 | Foerster | H04L 67/2847 |
| | | | | 709/213 |
| 2015/0109987 | A1* | 4/2015 | Wang | H04W 12/08 |
| | | | | 370/312 |
| 2015/0227549 | A1* | 8/2015 | Moon | G06F 16/183 |
| | | | | 707/827 |
| 2017/0126674 | A1* | 5/2017 | Lee | H04W 12/06 |
| 2017/0164161 | A1* | 6/2017 | Gupta | H04W 4/06 |
| 2018/0041958 | A1* | 2/2018 | Narayanan | H04W 76/28 |

FOREIGN PATENT DOCUMENTS

| | | |
|---|---|---|
| WO | 2011099911 A1 | 8/2011 |
| WO | 2015153589 A1 | 10/2015 |
| WO | 2016/137463 A1 | 9/2016 |

OTHER PUBLICATIONS

Written Opinion (PCT/ISA/237) dated Oct. 24, 2017, by the European Patent Office as the International Searching Authority for International Application No. PCT/EP2017/074997.

Office Action (Notice of Preliminary Rejection) dated Apr. 28, 2020, by the Korean Patent Office in corresponding Korean Patent Application No. 10-2019-7009224 and English translation of the Office Action. (8 pages).

Office Action dated Dec. 30, 2020, by the Chinese Patent Office in corresponding Chinese Patent Application No. 201780061284.7 and English translation of the Office Action. (11 pages).

* cited by examiner

METHOD, DATA SENDING CONTROL SERVER, STORAGE SERVER, PROCESSING SERVER AND SYSTEM FOR SENDING DATA TO AT LEAST ONE DEVICE

FIELD OF THE INVENTION

The invention relates generally to a method for sending data to at least one device.

The present invention is notably applicable to a mobile (radio-communication) field wherein a (mobile) (tele)phone, as a device, may cooperate with a chip, to access one or several services. The chip may be embedded, such as an embedded Universal Integrated Circuit Card (or eUICC) or an integrated Universal Integrated Circuit Card (or iUICC) within the device, or removable, such as a chip included within a smart card termed Subscriber Identity Module (or SIM) type card or the like, as a Secure Element (or SE), from a chip host device.

Within the present description, an SE is a smart object that includes a chip that protects, as a tamper resistant component, access to stored data and is intended to communicate data with an SE host device, such as a phone, a tablet, a Machine to Machine (or M2M) or an Internet of Things (or IoT) device or the like.

Moreover, the invention also relates to a data sending control server, a data storage server and a data processing server for sending data to at least one device.

Finally, the invention pertains to a system for sending data to at least one device as well.

STATE OF THE ART

As known per se, a Subscription Management-Data Processing (or SM-DP) server is used to provide a fleet of eUICCs, as (client) devices, with subscription profiles, as data that have to be kept secret. The data may be sent by the SM-DP server itself (then termed SM-DP+) or a Subscription Management-Secure Routing (or SM-SR) server. In this latter case, the SM-SR server only acts as a proxy server to securely transport the data but is not able to encipher or transform the data.

However, an attacker may steal data stored by the SM-DP server.

WO 2015/153589 A1 describes a technique for controlling and coordinating an M2M service layer and 3GPP networks, so as to control overload and/or manage congestion. Such a technique uses a User Data Repository that receives a request from and sends to a Service Capability Server data, as a request response.

However, an attacker may steal data stored by the User Data Repository by usurpating the identity of the Service Capability Server.

WO 2011/099911 A1 describes a technique for scheduling of an information transmission from an Information Providing Device to a Subscriber Equipment in a communication system. Such a described technique uses an Application Server that decides when information from the Information Providing Device is to be sent to the Subscriber Equipment. When decided, the Application Server sends to the Information Providing Device a request for sending data to the Subscriber Equipment. However, an attacker may steal data stored by the Information Providing Device by usurpating the identity of the Application Server and re-directing the data to a fraudster device.

There is a need to provide a solution that allows avoiding an attacker to access data from outside.

SUMMARY OF THE INVENTION

The invention proposes a solution for satisfying the just herein above specified need by supplying a method for sending data to at least one device. According to the invention, the method comprises the following steps. A data sending control server sends to at least one data storage server at least one predetermined rule or a first request for sending data to at least one data processing server. The at least one data storage server sends, based upon the at least one predetermined rule or the first request for sending data, to the at least one data processing server data. The data sending control server sends to the at least one data processing server a second request for sending to the at least one device the data received or to be received by the at least one data processing server. The at least one data processing server sends, based upon the second request for sending the data, to the at least one device the received data.

The principle of the invention consists in that a data sending control server provides one or several data storage servers with a first request or one or several predefined rules for sending data to a data processing server(s). Each (thus involved) data storage server transmits to the data processing server(s) data while executing the provided first request or satisfying the provided data sending rule(s). The data sending control server provides the data processing server(s) with a second request for addressing to a device(s) the data after its reception from the data storage server(s). The data processing server(s) transmit(s), while executing the provided second request, to the concerned destination or target device(s) the received data.

The data sending control server ensures that the concerned data is only transmitted to the target device(s) after the data processing server(s) is(are) effectively instructed accordingly and has received the concerned data.

The data sending control server keeps thus a full control on a transmission of the concerned data to the target device(s) while ordering and/or instructing separately the involved data storage server(s) and data processing server(s).

Such an ordering and/or instructing separation allows filtering a transmission of the concerned data to the target device(s) in a preferential manner when applicable only, i.e. for the data to be transmitted.

The data processing server(s) does only access the data that has to be transmitted to the target device(s) preferably in a close manner, like e.g. one or several hours before a forecast transmission, limiting thus an access to the concerned data.

The invention solution allows loading data to a target device(s) in a limited manner based on a control by a data sending control server, such as a server relating to a Mobile Network Operator (or MNO) or the like.

Contrary to the above mentioned prior art solution, the invention allows avoiding an attacker to steal data that has not yet been received at a data processing server side since the data processing server(s) do(es) not access the concerned data.

According to a further aspect, the invention is a data sending control server. According to the invention, the data sending control server is configured to send to at least one data storage server at least one predetermined rule or a first request for sending data to at least one data processing server. And the data sending control server is configured to send to the at least one data processing server a second request for sending to the at least one device the data received or to be received by the at least one data processing server.

The data sending control server may include a server relating to an MNO, a Mobile Virtual Network Operator (or MVNO) or a service provider.

According to still a further aspect, the invention is a data storage server for sending data to at least one device. According to the invention, the data storage server is configured to receive at least one predetermined rule or a first request for sending data to at least one data processing server. And the data storage server is configured to send, based upon the at least one predetermined rule or the first request for sending data, to the at least one data processing server data.

According to an additional aspect, the invention is a data processing server for sending data to at least one device. According to the invention, the data processing server is configured to receive data and to receive a second request for sending to the at least one device the data received or to be received by the data processing server. And the data processing server is configured to send, based upon the second request for sending the data, to the at least one device the received data.

According to still an additional aspect, the invention is a system for sending data to at least one device. According to the invention, the system includes a data sending control server, at least one data storage server and at least one data processing server. The data sending control server is configured to send to the at least one data storage server at least one predetermined rule or a first request for sending data to at least one data processing server. The at least one data storage server is configured to send, based upon the at least one predetermined rule or the first request for sending data, to the at least one data processing server data. The data sending control server is configured to send to the at least one data processing server a second request for sending to the at least one device the data received or to be received by the at least one data processing server. And the at least one data processing server is configured to send, based upon the second request for sending the data, to the at least one device the received data.

As to the at least one device, it may include one or several SEs, one or several terminals and/or one or several user terminals.

The (user) terminal(s) may include a mobile phone(s), a portable device(s), such as a handheld computer(s), like e.g. a Personal Digital Assistant(s) (or PDA), a palm-top computer(s), a Personal Computer(s) (or PC), a Voice Over Internet Protocol (or VOIP) handset(s), a netbook(s), a tablet(s), a set-up box(es), a media player(s), a game console(s), a TeleVision (or TV) set(s), a machine of an M2M device(s), such as a vehicle computer(s), and/or an IoT device(s).

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a particular embodiment in which the invention method for sending data to a device(s) is implemented by using, at a server side, a data sending control server, one data storage server and one data processing server and a set of eUICCs, at a client device side.

Each eUICC includes a chip incorporated, possibly in a removable manner, within a Printed Circuit Board (or PCB) of a user terminal or terminal, as a chip host device.

The chip may also incorporate at least part of the terminal component(s), like e.g. a baseband processor, such as an iUICC, an application processor and/or other electronic component(s).

Alternately, instead of an eUICC or an iUICC, the chip may be or include a Trusted Execution Environment (or TEE), as a secure area of a terminal processor and a secured runtime environment.

The chip is preferably included within an SE.

The SE may nevertheless have different form factors.

Instead of being embedded within its host device, the chip may be carried by a medium, such as a smart card or a dongle, like e.g., a Universal Serial Bus (or USB) type dongle, and is communicatively coupled or connected to its host device.

The invention does not impose any constraint as to a kind of the SE, when present.

As removable SE, it may include a smart dongle of the USB type, a (micro) Secure Digital (or SD) type card, a Multi-Media type Card (or MMC), a SIM type card or any format medium to be connected or coupled to a chip host device.

Alternatively, the SE includes a chip that is fixed to a chip host device.

According to another embodiment, the invention method for sending data to devices is implemented by a data sending control server, two or more data storage servers and one, two or more data processing servers. The data sending control server plays a master role by controlling each involved data storage server and each involved data processing server to transmit data to the devices preferably in a limited and selected manner. According to such an embodiment (not represented), each server is adapted to carry out the functions carried out by the data sending control server, the data storage server or the data processing server of the embodiment that is described infra.

Naturally, the described embodiment is only for exemplifying purposes and is not considered to reduce the scope of the invention.

Figure 1:
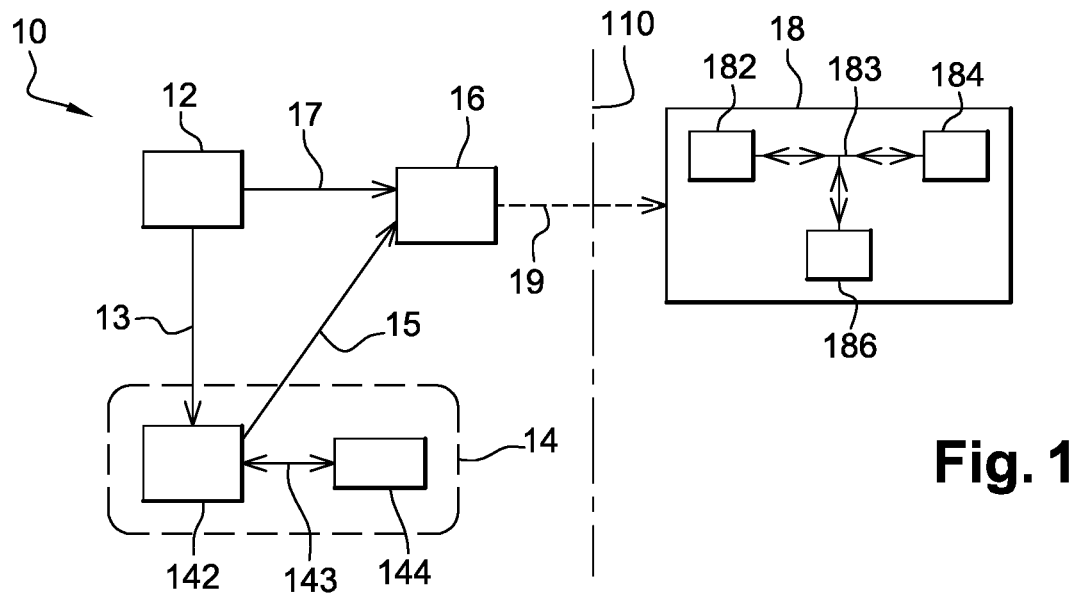
FIG. 1 illustrates a simplified diagram of one embodiment of a system for sending data to (target) devices, with a data sending control server, one data storage server and one data processing server, according to the invention.

FIG. 1 shows schematically, at a left side of a vertical line 110, a system 10 for sending data to a fleet of eUICCs, as SEs and devices.

Such a system includes a data sending control server 12, a data storage server(s) 142 and a data processing server(s) 16.

For sake of simplicity, the data sending Control Server 12, the data Storage Server 142, the data Processing Server 16 are termed infra the CS 12, the SS 142 and the PS 16 respectively.

The CS 12 is preferably connected, on the one hand, via a first link(s) 13, directly or through one or several entities, to the SS(s) 142 and, on the other hand, via a second link(s) 17, directly or through one or several entities, to the PS(s) 16.

The (or each) SS 142 is preferably connected, via a third link(s) 15, directly or through one or several entities, to the PS 16.

It is to be noted that, at a right side of the line 110, only one SE 18, as a device, is represented at the client device side for clarity reason. However, it is clear that the system 10 is able to provide a fleet of devices with data to be shared individually under control of the CS 12, through the SS(s) 142 and the PS(s) 16, with the SE 18.

Instead of an SE, the device may comprise or be connected to wire, ContacT-Less (or CTL) and/or wireless communication means for exchanging data with outside and comprise or be connected to means for storing data.

Within the present description, the adjective "CTL" used within the expression "CTL communication means" has, as meaning, notably that the communication means communicates via one or several Short Range (or SR) RF links. The SR RF may be related to a Near Field Communication (or NFC) type, Bluetooth type or Wifi type technology. Such a set of technology types is not exhaustive. Such an SR RF link may be used for exchanging data between the device 18 and the PS 16, at an SR distance typically from around 20 cm (such as with an NFC type technology) to around 800 m (such as with a Bluetooth or Bluetooth Low Energy (or BLE) type technology). The SR RF link may be fixed, for instance, at 13.56 Mhz for NFC with a range up to around 20 cm, at 2.4-2.5 GHz with a range of about 10 m to about 100 m (for Zigbee (e.g. IEEE 802.15.4), Wifi and Bluetooth or BLE (e.g. IEEE 802.15.1)), from around 2.4 GHz to around 10 GHz (for Ultra Wide Band (or UWB) e.g. IEEE 802.15.4a).

Within the present description, the adjective "wireless" used within the expression "wireless communication means" has, as meaning, that the communication means communicates via one or several Long Range (or LR) Radio-Frequency (or RF) links. The LR RF may be fixed at several hundreds of MHz, for instance, around 850, 900, 1800 and/or 1900 MHz.

The PS 16 may be separated from the client side through one or several servers and/or other entity(ies), such as a network entity(ies) (not represented), like e.g. an entity(ies) comprised within a mobile (radio-communication) network(s).

The mobile network(s) may include a Global System for Mobile communications (or GSM), a General Packet Radio Service (or GPRS), a Universal Mobile Telecommunications System (or UMTS), a Code Division Multiple Access (or CDMA) and/or a Long Term Evolution (or LTE) type network(s).

The mobile network set is not exhaustive but only for exemplifying purposes.

Instead of a mobile network(s) or additionally, the network(s) includes an Internet type network accessible possibly, via a CTL link(s), through an intermediate entity(ies), like e.g. a Network Access Point (or NAP) (not represented).

The CS 12 may be an Over-The-Air (or OTA), an Over-The-Internet (or OTI) and/or an Over The Cloud (or OTC) server.

The CS 12 may be operated or managed by an MNO, an MVNO and/or on its behalf, as a service provider.

The CS 12, the (or each) SS 142 and the (or each) PS 16 are preferably each hosted by a computer with one or several processors and/or one or several controllers (not represented), as data processing means, and one or several Input/Output (or I/O) interfaces (not represented).

Each server is identified by a Uniform Resource Identifier (or URI), a Uniform Resource Locator (or URL), an email address and/or an Internet Protocol (or IP) address relating to the concerned server.

The CS 12 comprises or is connected to one or several memories (not represented).

The CS memory(ies) store(s) one or several predetermined rules for sending subscription profiles, as data.

The CS memory(ies) may store subscription profiles to be provided to at least some target devices.

The predetermined data sending rules may include one or several events, like e.g. a date and/or a time at which the PS 16 has to transmit data to the concerned device(s), that will occur, are detectable from the PS 16 and trigger a data sending from the PS 16 to the concerned device(s).

According to a first essential invention feature, the CS 12 is adapted to send to the (or several) SS(s) 142 one or several predetermined rules or a first request for sending to the PS 16 one or several subscription profiles, as data, to provide a set of one or several devices, like e.g. the eUICC 18, with the data.

The CS 12 may send one or several subscription profiles that are stored at the CS 12 side.

According to a second essential invention feature, the CS 12 is arranged to send to the (or several) PS(s) 16 a second request for sending to the devices, like e.g. the eUICC 18, data. The concerned data has to be received from the involved SS(s) 142 before its transmission to the concerned devices.

The (or each) SS 142 is preferably a server that is included within a secured environment 14, i.e. a place, such as an MNO, an MVNO or a service provider infrastructure, where a physical access is limited to only an authorized person (people) and/or a digital access is limited to only some particular identified entity(ies), namely the CS 12 that is preferentially previously authenticated, so as to protect access to data managed at the SS 142 side.

The (or each) SS 142 is connected to (or comprise) one or several memories 144.

The (or each) SS memory(ies) 144 is also preferably included within the secured environment 14 or another possibly more secured environment (not represented).

The (or each) SS 142 is preferably a server that receives and/or sends data with an interlocutor(s), in a ciphered manner, so as to protect access to the concerned data.

The SS memory(ies) 144 store(s) data to be transmitted, through the PS 16, to the devices. Such a storing, at the SS 142 side, of the data to be transmitted allows isolating the concerned data from outside.

Each set of data relating to one subscription profile includes preferably:
- an International Mobile Subscriber Identity (or IMSI) or the like, as a subscriber and a (service) subscription identifier for accessing a mobile network(s);
- a key Ki, as a Network Authentication Key (or NAK), allowing to authenticate the concerned subscriber to the concerned mobile network(s);
- Milenage or the like, as a network authentication algorithm, allowing to authenticate the concerned subscriber to the concerned mobile network(s);
- a file system including one or several Elementary Files (or EF);

one or several security keys, like e.g. a key(s) for enciphering/deciphering data and/or a key(s) for signing data a key(s), as secret data; and/or one or several credentials, like e.g. a user name and/or an IDentifier (or ID) of the subscriber, as data relating to the user.

When there are several SSs, each SS may be dedicated to store a predetermined type of data, like e.g., an identifier relating to a subscription/subscriber, such as an IMSI for one SS, and a key for authenticating the subscriber to a mobile network(s) for at least (an)other SS.

Optionally, the (or each) SS 142 is able to generate at least in part data to be transmitted to the devices.

The SS memory(ies) store(s) preferably a set of one or several authorized servers, as a sender of instruction(s)/order(s) to be received and an authorized CS(s) 12. Such an authorized sender server set allows avoiding to receive instruction(s)/order(s) to be received from a fake sender, as a fraudster (data sending) control server.

The SS memory(ies) 144 store(s) preferably a set of one or several authorized servers, as an addressee of data to be transmitted and an authorized PS 16. Such an authorized addressee server set allows avoiding to address data to be transmitted to a fake addressee, as a fraudster (data) processing server.

The (or each) SS 142 is configured to receive one or several predetermined rules or a first request for sending data to a PS(s), like e.g., the PS 16. The concerned PS(s) is(are) either predefined or identified by or through the CS 12. The predetermined rule(s) or the first data sending request has(have) preferably to originate from the CS 12 only.

The (or each) SS 142 is adapted to send, based on the predetermined rule(s) or the first data sending request, to the concerned PS(s), like e.g. the PS 16, the data.

The (or each) PS 16 may be an OTA, an OTI and/or an OTC server, like e.g. an SM-SP type server or a Trusted Service Manager (or TSM) type server.

The (or each) PS 16 may be operated or managed by a service provider.

The (or each) PS 16 comprises or is connected to one or several memories (not represented).

The (or each) PS 16 is adapted to receive data from the SS(s) 142 and transmitted to (target) devices. The concerned data has to be received from the SS(s) 142 before its transmission to the concerned device(s).

The PS memory(ies) store(s) the data to be received from the SS(s) 142 and transmitted to the device(s).

The PS memory(ies) store(s) preferably a set of one or several authorized servers, as a sender of instruction(s)/order(s) to be received and an authorized CS(s) 12. Such an authorized sender server set allows avoiding to receive instruction(s)/order(s) to be received from a fake sender, as a fraudster (data sending) control server.

The PS memory(ies) store(s) preferably a set of one or several authorized servers, as a sender of data to be received and an authorized SS(s) 142. Such an authorized server set allows avoiding to receive data to be received from a fake sender, as a fraudster (data) storage server.

The (or each) PS 16 is arranged to receive a second request for sending to a device(s), like e.g., the eUICC 18, data that has been received or to be received by the PS 16. The concerned device(s), as target device(s), is(are) identified by or through the CS 12.

The (or each) PS 16 is adapted to send, possibly through one or several intermediate entities (not represented), via a communication link(s) 19, to the devices, like e.g. the eUICC 18, the received data.

The (or each) PS 16 may process the received data in a manner that is adapted to each device which the received data is intended to.

Alternately or additionally, the (or each) PS 16 may process the received data in a manner that is specific to the concerned involved PS 16.

The (or each) PS 16 may combine the received data before its transmission, so as to build a data package to be provided to each identified individual (target) device.

Each device, as one device of a device fleet, is preferably associated with or tied to the CS 12.

Each device 18 includes one or several chips.

Each device 18 may include data processing means, such as one (micro)processor(s) (and/or one (micro)controller(s)) 182.

The device processor(s) 182 process(es), control(s) and communicate(s) internally data with all the other components incorporated within the chip and, through the I/O interfaces 186, with the chip exterior.

Each device 18 includes data storing means, such as one or several memories 184, and one or several I/O interfaces 186 that are linked all together through a control and data bus 183.

The device memory 124 stores preferably a Network Access Identifier (or NAI), an Integrated Circuit Card Identifier (or ICCID), a Chip or Card Serial Number (or CSN), a User Identity Module IDentifier (or UIMID)/Expanded User Identity Module IDentifier (or EUIMID), an eUICC IDentifier (or eID), a URL, URI, an IP address and/or an email address, as an identifier(s) relating to the device 18. The device 18 identifier(s) allow(s) identifying, in a unique manner, the device 18.

Each device I/O interface 186 allows communicating data from the internal chip components to the chip exterior and conversely.

The device memory 184 may store one or several applications, like e.g. a SIM type application(s). The SIM type application(s) allow(s) identifying and authenticating to one or several mobile networks.

Figure 2:
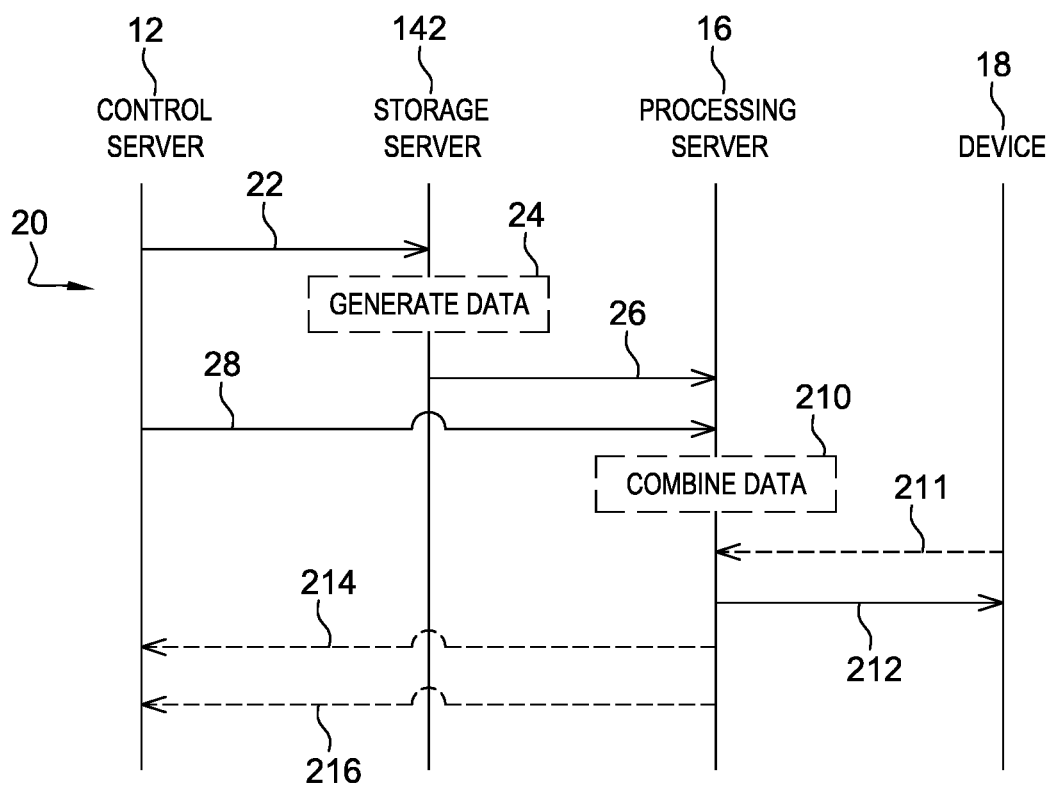
FIG. 2 represents an embodiment of one message flow between notably the servers and one particular device of FIG. 1, in which, separately, the control server instructs or orders the storage server to send data to the processing server, the control server orders the processing server to send to the device the data and the processing server sends the received data to the device.

FIG. 2 depicts an exemplary embodiment of a message flow 20 that involves notably the CS 12, the (or several) SS(s) 142, the PS 16 and the device 18 in which the CS 12 controls, while addressing separately the SS(s) 142 and the PS 16, a transmission of data to be transferred, through the SS(s) 142 and the PS 16, to the device 18.

In the explained embodiment, it is assumed that the CS 12 plays both a role of an administrator of the device 18 and a controller of the SS(s) 142 and the PS 16.

The CS 12 sends, preferably on its initiative, to the SS(s) 142 a message 22 including one or several predetermined rules or a first request for sending data to the PS 16.

The CS 12 does not expose preferably any Application Programming Interface (or API) and/or the like, as an entry point(s), and decides when to send to the SS(s) 142 and the PS 16 the data sending instructions and/or orderings.

Optionally, the message 22 includes or is accompanied with at least a part of the data to be transmitted to the PS 16.

The message 22 includes or is accompanied with an identifier(s) relating to each concerned target device(s) 18.

The (or each) SS 142 receives the message 22 including one or several predetermined rules or a first request for sending data to the PS 16.

Optionally, the (or each) SS 142 generates 24, after having received the message 22, or has previously generated at least in part the data to be transferred to the concerned target device(s) 18.

The (or each) SS 142 sends, based on the predetermined rule(s) or the first request for sending data to the PS 16, to the PS 16, one or several messages 26 including the data that is previously generated at the SS(s) 142 side or at the CS 12 side.

The (or each) SS 142 does not expose preferably any API and/or the like, as an entry point(s), and decides when to send to the PS 16 the data.

The CS 12 sends, preferably on its initiative, to the PS 16 one or several messages 28 including a second request for sending to the concerned device(s) 18, as a target device(s), the data received or to be received by or through the PS 16.

Optionally, the PS 16 combines 210 the data received and/or to be received from the SS(s) 142 by the PS 16, so as to associate and collect the (received) data to generate a data package for each individual target device 18. The PS 16 addresses only to the device(s) that is(are) identified by the CS 12 within the received message(s) 28 originating from the CS 12.

One or several devices that are previously identified as being authorized addressees, i.e. that have been previously identified by the CS 12, may also send to the PS 16 or another server connected to the PS 16 a message 211 including a request for receiving data, updated data or next data.

The PS 16 sends, based on the second request for sending to the concerned device(s) 18, the data received by the PS 16, to each concerned device 18 one or several messages 212 including the received data.

Advantageously, only a small quantity of data is sent at a time, like e.g. a fleet of 1000 subscription profiles in one or several hours, so as to limit, as far as possible, an access to the concerned data. Such a weak data availability from outside the system 10 allows isolating the concerned data from any potential attacker. The data is therefore accessible through the PS 16 only in a limited time period (and not permanently). A potential attacker may access only the data available and stored at the PS 16, when its access is not enough secured.

Optionally, the device 18 sends to the PS 16 or another server connected to the PS 16 a message (not represented) including a data receipt acknowledgement.

Alternately or additionally, once the data is received from the PS 16 and used for the first time by the device 18, the device 18 may send to the PS 16 a message (not represented) including information about a usage of the received data.

Once the received data is sent from the PS 16 to the device 18, the PS 16 may send to the CS 12 a message 214 including information about an occurrence of a sending of the received data.

Alternately or additionally, once the received data is sent from the PS 16 to the device 18, the PS 16 may send to the CS 12 a message 216 including a request for receiving next data.

The CS 12 may repeat, preferably after a previous data sending campaign, the described method 20 to send next data to the same devices and/or other devices for a new data sending campaign.

The invention solution is compatible with the existing network infrastructure.

The invention solution allows reducing a time window of access to data to be transmitted, like e.g., one subscription profile per minute, from any involved PS. Thus, only the data that is really to be used is stored at the PS side during a reduced time window.

The invention solution allows securing an access to data by exposing during a reduced time window and issuing only data to be preferably really used at the device side.

The invention claimed is:

1. A method for sending data to at least one device, wherein the method comprises the following steps:
    sending, from a data sending control server to at least one data storage server, a first request for sending data to at least one data processing server and to be sent to the at least one device, wherein the first request comprises a first data to be sent to the at least one device;
    sending, from the at least one data storage server, based upon the first request for sending data to the at least one data processing server, to the at least one data processing server, a second data stored at the at least one data storage server and the received first data;
    sending, from the data sending control server to the at least one data processing server, a second request for sending to the at least one device the first data and the second data received or to be received by the at least one data processing server; and
    sending, from the at least one data processing server, based upon the second request for sending to the at least one device the first data and the second data received or to be received by the at least one data processing server, to the at least one device, the received first data and the received second data,
    wherein the received first data and the received second data are part of one or more subscription profiles associated with the at least one device.

2. Method according to claim 1, wherein the data processing server combines the second data received from the at least one data storage server, so as to associate and collect the received data to generate a data package for each of the at least one device.

3. Method according to claim 1, wherein, once the received first data and the received second data are sent to the at least one device from the at least one data processing server, the at least one data processing server sends, to the data sending control server, information about an occurrence of a sending of the received first data and the received second data.

4. Method according to claim 1, wherein, once the received first data and the received second data are sent to the at least one device from the at least one data processing server, the at least one data processing server sends, to the data sending control server, a request for receiving next data.

5. Method according to claim 1, wherein, prior to sending the first data and the second data to the at least one device, the at least one device sends, to the at least one data processing server, a request for receiving next data.

6. A data storage server for sending data to at least one device, wherein the data storage server is configured to:
    receive, from a data sending control server, a first request for sending data to at least one data processing server and to be send to the at least one device, wherein the first request comprises a first data to be sent to the at least one device; and
    send, based upon the first request for sending data to at least one data processing server, to the at least one data processing server, a second data stored at the at least one data storage server and the received first data, wherein the first data and the second data are part of one or more subscription profiles associated with the at least one device.

7. Server according to claim 6, wherein the data storage server is further configured to generate at least in part the second data to be sent to the at least one data processing server.

8. A system for sending data to at least one device, the system comprising:
- a data sending control server,
- at least one data storage server,
- and at least one data processing server,
- wherein the data sending control server is configured to send, to the at least one data storage server, a first request for sending data to at least one data processing server and to be sent to the at least one device, wherein the first request comprises a first data to be send to the at least one device;
- wherein the at least one data storage server is configured to send, based upon the at least the first request for sending data to at least one data processing server, to the at least one data processing server, a second data stored at the least one data storage server and the received first data;
- wherein the data sending control server is configured to send, to the at least one data processing server, a second request for sending to the at least one device the first data and the second data received or to be received by the at least one data processing server;
- and wherein the at least one data processing server is configured to send, based upon the second request for sending to the at least one device the first data and the second data received or to be received by the at least one data processing server, to the at least one device, the received first data and the received second data,
- wherein the received first data and the received second data are part of one or more subscription profiles associated with the at least one device.

* * * * *